US007908093B2

(12) United States Patent
Fjeldsted et al.

(10) Patent No.: US 7,908,093 B2
(45) **Date of Patent: *Mar. 15, 2011**

(54) MASS SPECTROMETER AND METHOD FOR ENHANCING RESOLUTION OF MASS SPECTRA

(75) Inventors: John Christian Fjeldsted, Redwood City, CA (US); August Jon Hidalgo, San Francisco, CA (US); William Daniel Frazer, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 12/188,932

(22) Filed: Aug. 8, 2008

(65) Prior Publication Data

US 2008/0300800 A1 Dec. 4, 2008

Related U.S. Application Data

(63) Continuation of application No. 11/412,887, filed on Apr. 27, 2006, now Pat. No. 7,412,334.

(51) Int. Cl.
*G06F 19/00* (2011.01)

(52) U.S. Cl. ............... 702/23; 702/28; 702/29; 250/281; 250/282

(58) Field of Classification Search .................... 702/23, 702/28–29, 137; 250/281–282
See application file for complete search history.

(56) References Cited

U.S. PATENT DOCUMENTS

| | | | |
|---|---|---|---|
| 6,373,052 | B1 | 4/2002 | Hoyes et al. |
| 6,433,713 | B1 | 8/2002 | Fuhrman |
| 6,653,626 | B2 | 11/2003 | Fischer et al. |
| 6,680,476 | B1 | 1/2004 | Hidalgo et al. |
| 6,744,044 | B2 | 6/2004 | Hidalgo et al. |
| 6,778,125 | B1 | 8/2004 | Stewart et al. |
| 6,822,227 | B1 | 11/2004 | Hidalgo et al. |
| 6,878,931 | B1 | 4/2005 | Roushall et al. |
| 7,047,144 | B2 | 5/2006 | Steiner |
| 7,412,334 | B2 | 8/2008 | Fjeldsted et al. |
| 2003/0173514 | A1 | 9/2003 | Syage et al. |
| 2003/0218129 | A1 | 11/2003 | Rather |

FOREIGN PATENT DOCUMENTS

| | | |
|---|---|---|
| GB | 2385982 | 9/2003 |
| WO | 2006116335 | 2/2006 |

OTHER PUBLICATIONS

UK Intellectual Property Office, Patents Act 1977: Search Report under Section 17(5), Sep. 13, 2007.

*Primary Examiner* — Drew A Dunn
*Assistant Examiner* — Hien X Vo

(57) ABSTRACT

A mass spectrometer comprises an ion detector, an analog-to-digital (A/D) converter, a sample adjuster, and an adder. The A/D converter is configured to generate digital samples representing an analog signal received from the ion detector during a mass scan. The adder is configured to sum the samples with corresponding unsuppressed samples representing analog signals received from the ion detector during previous mass scans, the summed samples defining a mass spectrum. The sample adjuster is configured to identify a peak defined by the samples and to suppress all but one of the samples defining the identified peak to enhance resolution of a peak in the mass spectrum.

20 Claims, 8 Drawing Sheets

MASS SPECTROMETER AND METHOD FOR ENHANCING RESOLUTION OF MASS SPECTRA

RELATED ART

This application is a continuation of U.S. patent application Ser. No. 11/412,887 filed on 27 Apr. 2006 now U.S. Pat. No. 7,412,334, the entire disclosure of which is incorporated into this application by reference.

In time-of-flight mass spectrometers (TOFMS), a mass sample to be analyzed is ionized, accelerated in a vacuum through a known potential, and then the arrival time of the different ionized components is measured at a detector. The larger the particle, the longer the flight time; the relationship between the flight time and the mass, m, can be written in the form:

$$\text{time}=k\sqrt{m}+c$$

where k is a constant related to flight path and ion energy, c is a small delay time, which may be introduced by the signal cable and/or detection electronics. When the term "mass" is used herein in the context of mass spectrometry of ions, it usually is understood to mean "mass-to-charge ratio."

An ion detector converts ion impacts into electrons. The signal generated by the detector at any given time is proportional to the number of electrons. There is only a statistical correlation between one ion hitting the detector and the number of electrons generated. In addition, more than one ion at a time may hit the detector due to ion abundance.

The mass spectrum generated by the spectrometer is the summed output of the detector as a function of the time-of-flight between the ion source and the detector. The number of electrons leaving the detector in a given time interval is converted to a voltage that is digitized by an analog-to-digital converter (A/D).

A mass spectrum is a graph of the output of the detector as a function of the time taken by the ions to reach the detector. In general, a short pulse of ions from an ion source is accelerated through a known voltage. Upon leaving the accelerator, the ions are bunched together but travelling at different speeds. The time required for each ion to reach the detector depends on its speed, which in turn, depends on its mass. Consequently, the original bunch is separated in space into discrete packets, each packet containing ions of a single mass, that reach the detector at different times.

A mass spectrum is generated by measuring the output of the A/D converter as a function of the time after the ions have been accelerated. The range of delay times is divided into discrete "bins." Unfortunately, the statistical accuracy obtained from the ions that are available in a single packet is insufficient. In addition, there are a number of sources of noise in the system that result in detector output even in the absence of an ion striking the detector. Hence, the measurement is repeated a number of times ("multiple scans") and the individual mass spectra are summed to provide a final result having the desired statistical accuracy and signal-to-noise ratio.

Unfortunately, small variations in the mass scans degrade resolution of the resultant mass spectra. Improving the resolution of the resultant mass spectra is generally desirable.

SUMMARY OF THE DISCLOSURE

Generally, embodiments of the present disclosure provide mass spectrometers and methods for enhancing resolution of mass spectra.

A mass spectrometer in accordance with one exemplary embodiment of the present disclosure comprises an ion detector, an analog-to-digital (A/D) converter, a sample adjuster, and an adder. The analog-to-digital (A/D) converter is configured to receive and sample an analog signal from the ion detector thereby providing a plurality of samples. The sample adjuster is configured to identify a peak defined by the samples and to adjust at least one of the samples based on the identified peak. The adder is configured to sum the samples. The summed samples define a mass spectrum and include a result of summing the at least one sample adjusted by the sample adjuster with a running sum of other ones of the samples.

A mass spectrometer in accordance with another exemplary embodiment of the present disclosure also comprises an ion detector, an A/D converter, a sample adjuster, and an adder. The A/D converter is configured to receive and sample an analog signal from the ion detector thereby providing a plurality of samples. The adder is configured to sum the samples, and the summed samples define a mass spectrum. The sample adjuster is configured to identify a peak defined by the samples and to suppress at least one of the samples of the identified peak such that a resolution of a peak within the mass spectrum is enhanced.

A method in accordance with an exemplary embodiment of the present disclosure comprises: detecting ions; transmitting an analog signal indicative of the detecting; sampling the analog signal thereby providing a plurality of samples; identifying a peak defined by the samples; summing the samples thereby defining a mass spectrum; and suppressing at least one of the samples based on the identifying such that a resolution of the mass spectrum is enhanced.

A method in accordance with yet another exemplary embodiment of the present disclosure comprises: detecting ions; transmitting an analog signal indicative of the detecting; sampling the analog signal thereby providing a plurality of samples; identifying a peak defined by the samples; summing the samples thereby defining a mass spectrum; and enhancing a resolution of a peak of the mass spectrum, wherein the enhancing comprises preventing, based on the identifying, at least one of the samples defining the identified peak from affecting the mass spectrum.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to mass spectrometers and methods for enhancing resolution of mass spectra. A time-of-flight mass spectrometer in accordance with one exemplary embodiment of the present disclosure, for each mass scan, ionizes a mass sample, and an ion detector provides an analog signal indicative of detected ion abundance as a function of time. The analog signal is sampled, and digitized samples from different mass scans are summed to define a resultant mass spectrum. The number of mass scans is selected to provide a desired statistical accuracy for the resultant mass spectrum.

During each mass scan, a sampling system samples the analog signal from the ion detector to provide digitized samples representative of the analog signal. The sampling system detects peaks in the digitized samples and, for each detected peak, identifies one sample representing the maximum sampled point of the detected peak, referred to hereafter as the peak's "maximum sample." All of the samples of the peak, except for the maximum sample, are suppressed so that the peak's maximum sample is the only unsuppressed sample representative of the detected peak. In particular, the sampling system sets all of the other samples of the detected peak to a value of zero. The digitized samples from the sampling system for the current mass scan are then summed with corresponding digital samples from previous mass scans. By suppressing at least some of the samples of the detected peaks other than the maximum sample for each peak, the resolution of the resultant mass spectrum is improved.

In other embodiments, more than one sample for each peak may be unsuppressed by the sampling system. For example, the three samples of each peak having the highest values may be unsuppressed by the sampling system. Other numbers of samples per peak, may be unsuppressed in other embodiments. Further, it is unnecessary for the same number of samples for each peak to be unsuppressed by the sampling system. For example, the sampling system may allow only one sample of a first peak to pass unsuppressed but allow three samples of another peak to pass unsuppressed.

Figure 1:
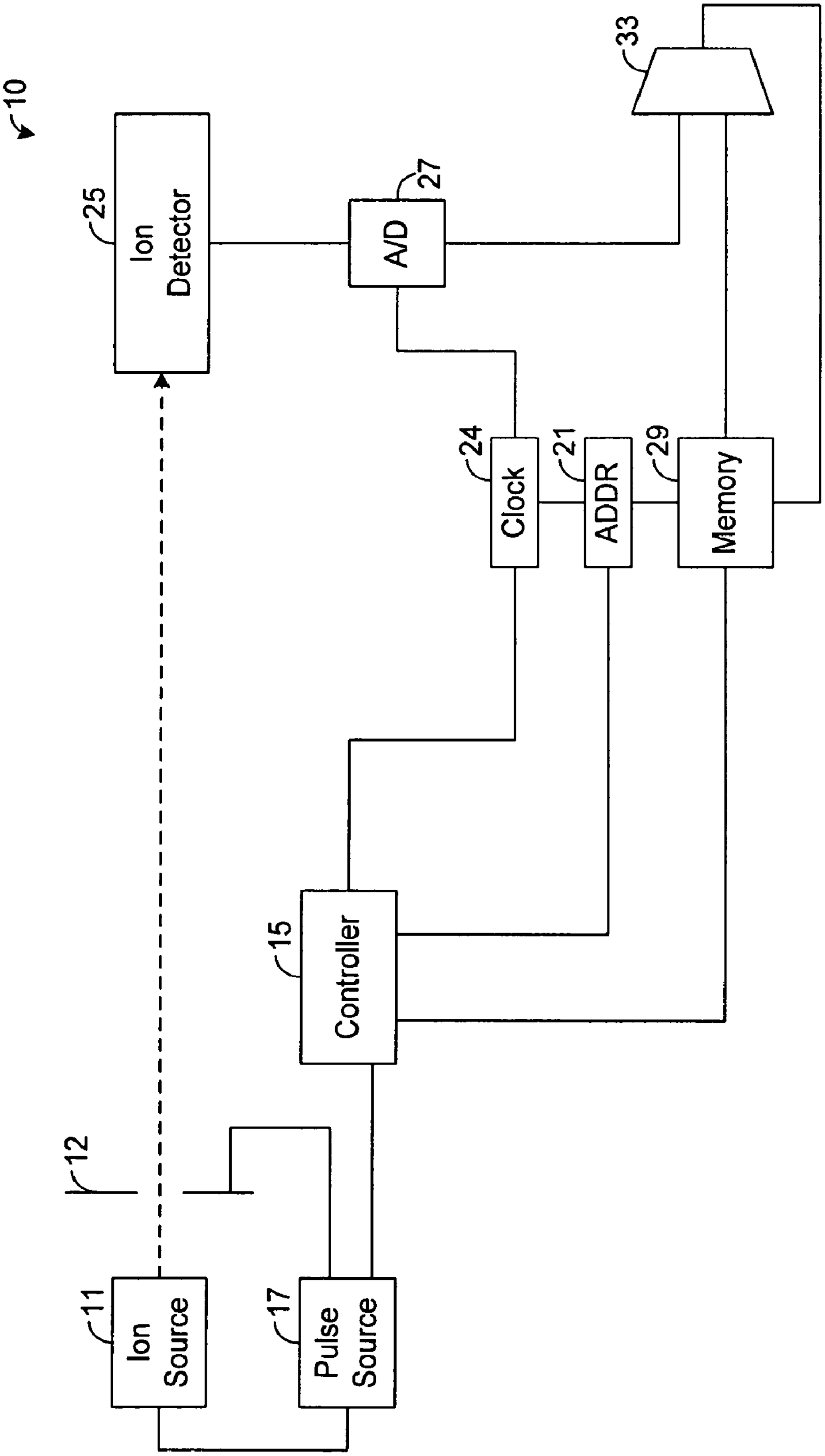
FIG. 1 (Prior Art)
FIG. 1 is a block diagram illustrating a conventional mass spectrometer.
Figure 2:
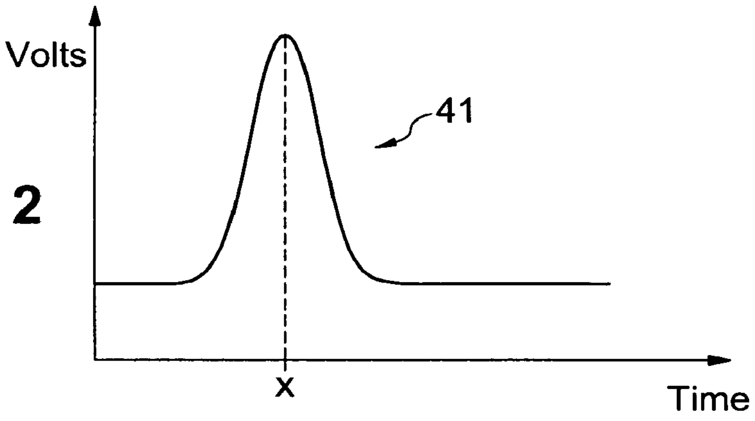
FIG. 2 is a graph illustrating an exemplary analog pulse output by an ion detector, such as is depicted in FIGS. 1 and 11, for a first mass scan.

FIG. 1 illustrates a conventional time-of-flight mass spectrometer 10. A mass sample to be analyzed is introduced into an ion source 11 that ionizes the sample. The ions so produced are accelerated by applying a potential between the ion source 11 and an electrode 12. The measurement of the mass sample to be analyzed is composed of multiple mass scans. At the beginning of each mass scan, a controller 15 causes a short pulse to be applied between the electrode 12 and ion source 11 by sending the appropriate control signal to a pulse source 17. The controller 15 also resets the contents of a write address register 21. On subsequent clock cycles, the address register 21 is incremented by a signal from a clock 24, and an analog signal generated by an ion detector 25 is digitized by an analog-to-digital converter (A/D) 27. The value stored in memory 29 at the address specified in the address register 21 is applied to an adder 33, which adds the stored value to the value provided by A/D converter 27. The summed value is then stored back in memory 29 at the address in question.

As noted above, the time required by an ion to traverse the distance between the electrode 12 and the detector 25 is a measure of the mass of the ion. This time is proportional to the value in address register 21 when the ion strikes the detector 25. Hence, memory 29 stores data that can be used to generate a graph of the number of ions with a given mass as a function of the mass. In other words, the data stored in memory 29 defines a mass spectrum of the sample being analyzed.

Various devices, such as a Faraday cup, multichannel plate (MCP), electron multiplier (continuous structure as well as dynode structure), conversion dynode, Daly detector, and combinations thereof, may be used to implement the ion detector 25. The signal generated by the ion detector 25 depends on the number of ions striking the detector 25 during the clock cycle in question. Moreover, in a time-of-flight mass spectrometer, heavier mass ions arrive at the ion detector 25 after lighter mass ions. The analog signal from the ion detector 25 as a function of time exhibits peaks that can be identified as originating from ions of specific masses. A pulse in the analog signal is due to ions of a particular mass striking the ion detector 25 over a small duration of time. Ions of the same mass are generally bunched together as they travel toward and strike the ion detector 25 and will be referred to hereafter as an "ion packet." Thus, ions within the same "packet" have the same mass. Further, pulses of the analog signal from the ion detector 25 will be referred to hereafter as "analog pulses."

In general, the number ions in an ion packet is relatively small, and hence the statistical accuracy of the measurements obtained in any single mass scan is usually insufficient. In addition, there can be a significant amount of noise in the system. The noise is generated both in the detector 25, analog path, and in the A/D converter 27.

To improve statistical accuracy, the data from a large number of mass scans are summed. At the beginning of the measurement process, the controller 15 stores zeros in all of the memory locations in memory 29 and initiates the first mass scan. When the first mass scan is completed, the controller 15 resets the address register 21 and initiates another mass scan by causing the pulse source 17 to pulse the electrode 12. The data from the second mass scan is added to that from the previous mass scan. This process is repeated until the desired statistical accuracy is obtained.

Unfortunately, small variations in the mass scans degrade resolution of the resultant mass spectrum defined by the data in memory 29. For example, clock jitter may cause small timing variations in the mass scans, and the effect of these small timing variations to the resultant mass spectrum can become significant as the output of the detector 25 for many different mass scans is summed. Further, variations in the pulse source 17 may cause the electrodes 12 to ionize the mass sample of the ion source 11 such that some ions of the same mass have slightly different initial energies. As a result, some ions of the same mass may strike the detector 25 at slightly different times. In addition, the detector 25 has finite rise and fall times. Thus, even if ions of the same mass were to strike the detector 25 at exactly the same time, the resulting pulse output by the detector 25 would have a width spanning over a finite range of time. The analog path, including the A/D converter 27, may further increase the width of the analog pulses output by the detector 25. These and other variations can significantly degrade the resolution of the resultant mass spectrum.

To better illustrate the foregoing, refer to FIGS. 2-5, which depict exemplary analog pulses 41-44 output by the detector 25. As shown by these figures, each pulse 41-44 has a finite width, which is related to the rise and fall times of the detector 25. Further, ions of the same mass may strike the detector 25 at different times due to certain variations, as described above, thereby increasing the finite widths of the pulses 41-44.

For illustrative purposes, assume that the pulses 41-44 depicted by FIGS. 2-5, respectively, are corresponding analog pulses output by the detector 25 for different mass scans. As used herein, pulses are "corresponding" if they are representative of ions of the same mass. Thus, each of the pulses 41-44 shown in FIGS. 2-5 ideally would occur at the same time (x) after the start of its respective mass scan, and these pulses are digitized and summed to define a single digital pulse in the resultant mass spectrum. However, as can be seen by comparing FIGS. 2-5, there can be slight timing offsets between the pulses 41-44 due to variations in the pulse source 17 and/or the detector 25. In this regard, assume that FIGS. 2-5 depict corresponding pulses 41-44 of four consecutive mass scans. The absolute peak of the pulse 41 shown by FIG. 2 occurs at time x after the start of the first mass scan, but the absolute peak of the pulse 42 shown by FIG. 3 occurs at a time greater than x after the start of the second mass scan. Further, the absolute peak of the pulse 43 shown by FIG. 4 occurs at a time less than x after the start of the third mass scan, and the absolute peak of the pulse 44 shown by FIG. 5 also occurs at a time less than x after the start of the fourth mass scan.

Figure 3:
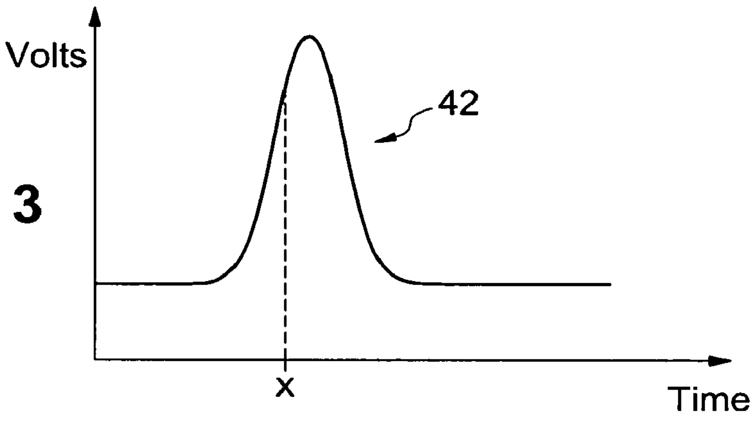
FIG. 3 is a graph illustrating a representation of an exemplary analog pulse output by an ion detector, such as is depicted in FIGS. 1 and 11, for a second mass scan and corresponding to the analog pulse of FIG. 2.
Figure 4:
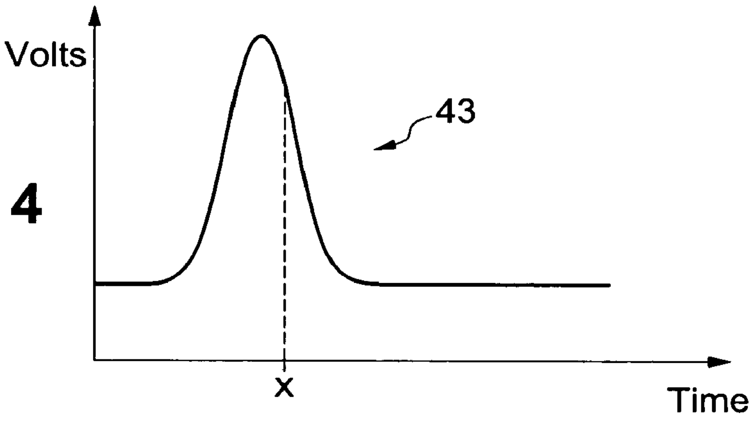
FIG. 4 is a graph illustrating a representation of an exemplary analog pulse output by an ion detector, such as is depicted in FIGS. 1 and 11, for a third mass scan and corresponding to the analog pulses of FIGS. 2 and 3.
Figure 5:
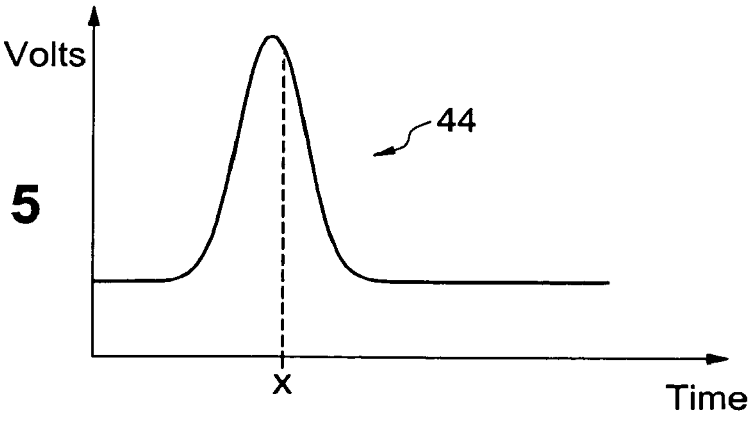
FIG. 5 is a graph illustrating a representation of an exemplary analog pulse output by an ion detector, such as is depicted in FIGS. 1 and 11, for a fourth mass scan and corresponding to the analog pulses of FIGS. 2-4.
Figure 6:
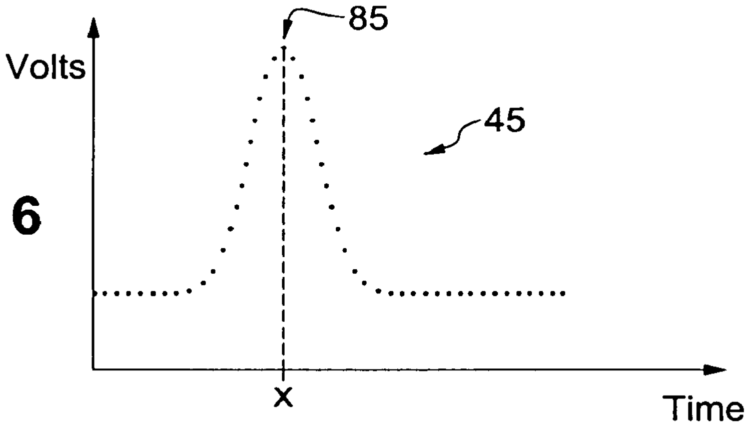
FIG. 6 is a graph illustrating a representation of exemplary digital samples of the analog pulse of FIG. 2.
Figure 7:
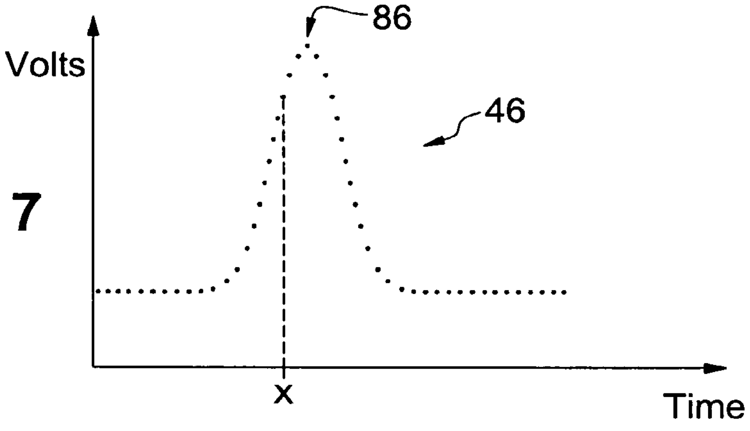
FIG. 7 is a graph illustrating a representation of exemplary digital samples of the analog pulse of FIG. 3.
Figure 8:
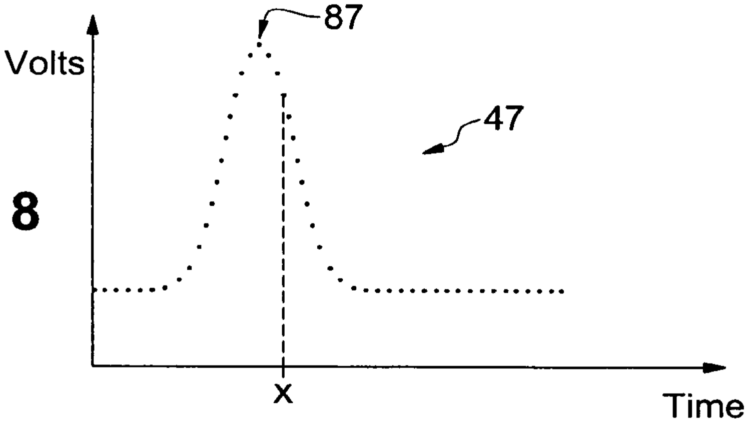
FIG. 8 is a graph illustrating a representation of exemplary digital samples of the analog pulse of FIG. 4.
Figure 9:
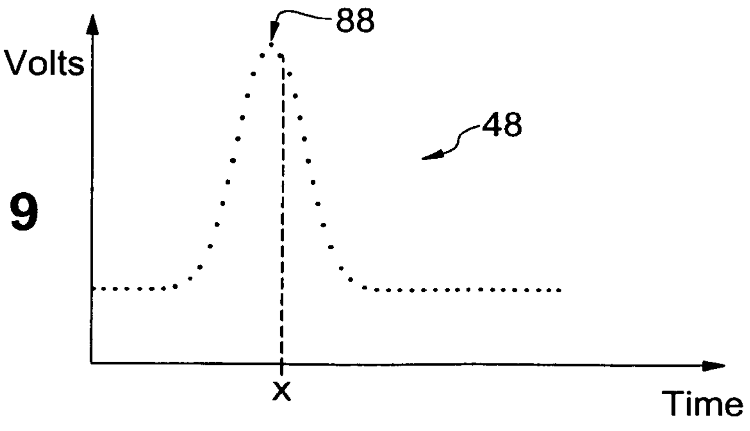
FIG. 9 is a graph illustrating a representation of exemplary digital samples of the analog pulse of FIG. 5.

Each of the pulses 41-44 is digitized by the A/D converter 27 (FIG. 1), which outputs digital samples of the pulses 41-44. In this regard, FIGS. 6-9 respectively depict digital pulses 45-48 that are defined by sampling the analog pulses 41-44 of FIGS. 2-5. Each point of the pulses 45-48 represents a sample of one of the analog pulses 41-44. In particular, FIG. 6 depicts a digital pulse 45 that is formed by digitally sampling the analog pulse 41 (FIG. 2), and FIG. 7 depicts a digital pulse 46 that is formed by digitally sampling the analog pulse 42 (FIG. 3). Further, FIG. 8 depicts a digital pulse 47 that is formed by digitally sampling the analog pulse 43 (FIG. 4), and FIG. 9 depicts a digital pulse 48 that is formed by digitally sampling the analog pulse 44 (FIG. 5).

Figure 10:
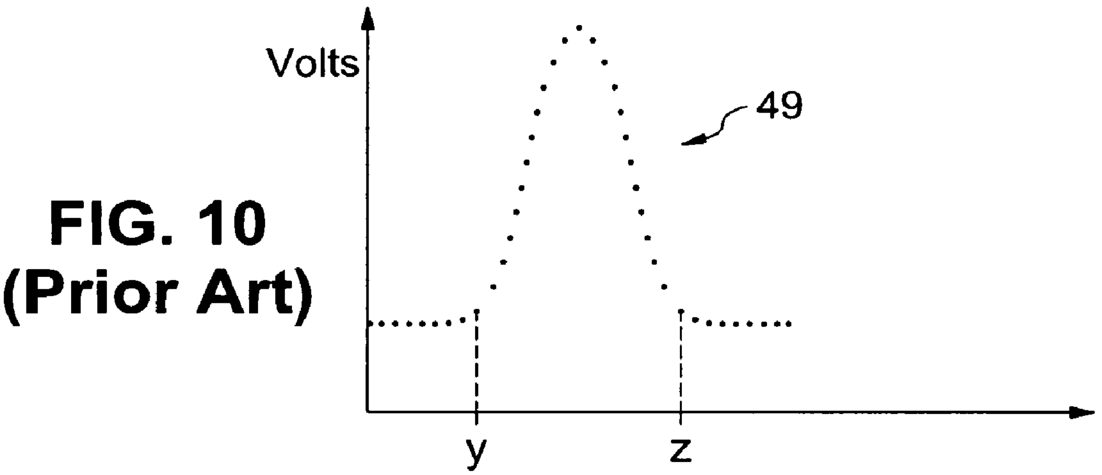
FIG. 10 (Prior Art)
FIG. 10 is a graph illustrating a representation of an exemplary pulse defined by the mass spectrometer of FIG. 1 in summing the digital samples of FIGS. 6-9.

FIG. 10 depicts a digital pulse 49, referred to as the "resultant pulse," resulting from the summation of the pulses 45-48 in FIGS. 6-9 as would be performed by the conventional mass spectrometer 10 (FIG. 1). The resultant pulse 49 has a relatively large width (z–y) in the time domain based on the widths of the pulses 41-44. Moreover, the aforedescribed offsets in timing of the analog pulses 41-44 increase, not only the widths of pulses 41-44, but also the overall width of the resultant pulse 49.

Figure 11:
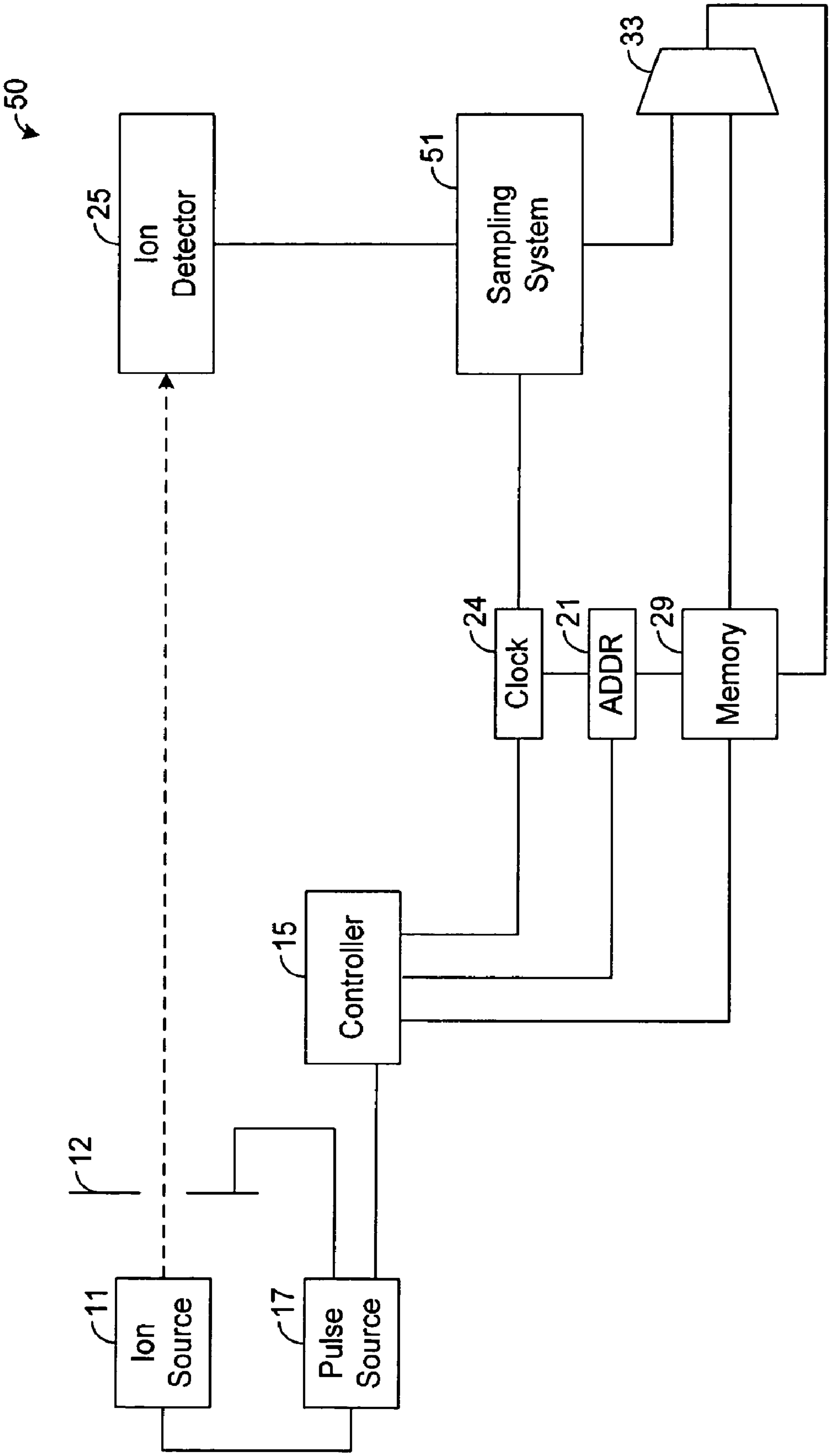
FIG. 11 is a block diagram illustrating a mass spectrometer in accordance with an exemplary embodiment of the present disclosure.

FIG. 11 depicts a time-of-flight mass spectrometer 50 in accordance with an exemplary embodiment of the present disclosure. To simplify the description of FIG. 11 and subsequent drawings, those elements that serve functions analogous to elements discussed above with reference to FIG. 1 have been given the same numeric designations.

Figure 12:
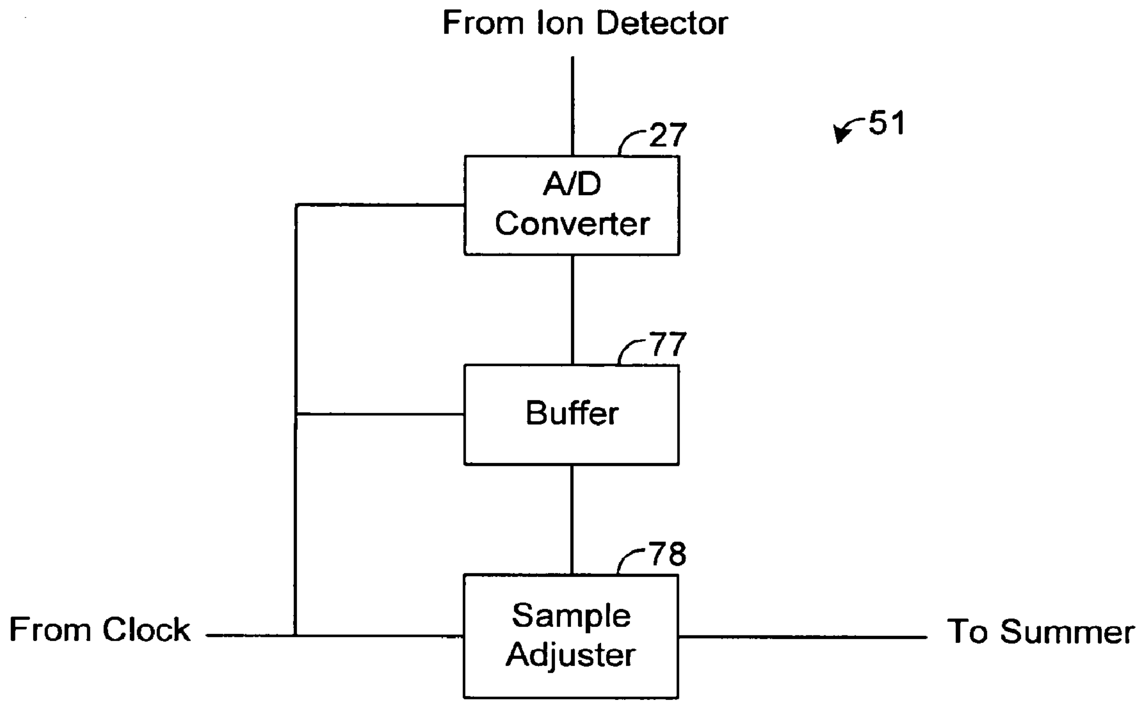
FIG. 12 is a block diagram illustrating an exemplary sampling system, such as is depicted in FIG. 11.

As shown by FIG. 11, the mass spectrometer 50 comprises an ion source 11, a controller 15, a pulse source 17, a write address register 21, a clock 24, an ion detector 25, memory 29, an adder 33, and a sampling system 51. As shown by FIG. 12, the sampling system 51 comprises an A/D converter 27. The elements 17, 21, 24, 25, 27, 29, and 33 perform essentially the respective functions as the elements of the same reference numerals in FIG. 1.

As described above with reference to FIG. 1, a mass sample to be analyzed is introduced into the ion source 11 that ionizes the mass sample. A pulse from the pulse source 17 causes the ions in the ion source 11 to be accelerated toward the ion detector 25, which detects the accelerated ions. The ion detector 25 outputs an analog signal indicative of the detected ions.

As in FIG. 1, the analog signal output by the detector 25 of FIG. 11 is sampled by the A/D converter 27 of FIG. 12. Referring to FIG. 12, the digitized samples from the A/D converter 27 are buffered by a buffer 77 and then processed by a sample adjuster 78, which will be described in more detail hereafter. Similar to the conventional mass spectrometer 10 of FIG. 1, digital samples from the sample adjuster 78 of FIG. 12 are summed by a summer 33 (FIG. 11) with samples from previous mass scans, and the results of the summing are stored to memory 29.

Thus, once the spectrometer 50 of FIG. 11 takes a measurement, which preferably includes a large number of mass scans, the memory 29 is storing measurement data similar to the embodiment depicted by FIG. 1. Each address in memory 29 is storing a running sum of digitized samples and represents a data point of the resultant mass spectrum defined by the measurement data in memory 29.

The controller 15 and the sample adjuster 78 can be implemented in hardware, software, or a combination thereof. As an example, the controller 15 and/or the sample adjuster 78 may be implemented in software and executed by a programmable logic array, a digital signal processor (DSP), a central processing unit (CPU), or other type of apparatus for executing the instructions of the controller 15 and/or the sample adjuster 78. In other embodiments, the controller 15 and/or the sample adjuster 78 can be implemented in firmware or hardware, such as logic gates, for example.

The sample adjuster 78 is configured to identify peaks in the samples received from the A/D converter 27. Further, for each identified peak, the sample adjuster 78 designates at least one sample as being an "active sample." As used herein, an "active sample" refers to a sample that is not to be suppressed by the sample adjuster 78.

Preferably, the sample adjuster 78, for each peak, is configured to identify a predefined number of the samples having the highest values as the peak's active samples. Thus, the active samples for a given peak represent the peak's maximum samples. In one embodiment, as will be described in more detail hereafter, the sample adjuster 78, for each peak, only identifies the sample having the highest value (i.e., the peak's maximum sample) as an active sample such that each peak has only one active sample. Further, the sample adjuster 78 allows all active samples to pass unsuppressed but suppresses all of the other samples (i.e., each sample not identified as an "active sample" by the sample adjuster 78). As used herein, a sample is "suppressed" when it is assigned a value lower than its actual value, as determined by the A/D converter 27, or it is prevented from affecting the data defining the resultant mass spectrum. In a preferred embodiment, the sample adjuster 78 suppresses a sample by assigning such sample a value of zero (0). Thus, each suppressed sample does not affect the resultant mass spectrum defined by the data stored in memory 29.

There are various techniques that may be employed by the sample adjuster 78 to identify peaks. In one embodiment, the sample adjuster 78 identifies a peak when a string of at least a minimum number, s, of consecutive samples having increasing values is immediately followed by a string of at least a minimum number, t, of consecutive samples having decreasing values. Note that the numbers s and t may be specified by a user or predefined within the sample adjuster 78. Further, s and t may be equal.

When a peak is detected, the maximum sample is the sample within the foregoing two strings having the highest value. Such a sample is preferably identified by the sample adjuster 78 as an active sample for the identified peak. Moreover, the sample adjuster 78 allows each sample identified as an active sample to pass unchanged through the sample adjuster 78 and suppresses each of the other samples.

To better illustrate the foregoing, assume that the ion detector 25 of spectrometer 50 outputs the corresponding analog pulses 41-44 in consecutive mass scans, as described above for the conventional spectrometer 10. In such an example, the A/D converter 27 receives the pulses 41-44 and outputs the digital pulses 45-48 shown by FIGS. 6-9 in response to the pulses 41-44, respectively. Assume that samples 85-88 are the maximum samples of the pulses 45-48, respectively, and that the sample adjuster 78 is configured to identify, for each peak, only the peak's maximum sample as an active sample. In such an example, the sample adjuster 78, upon identifying the peak of pulse 45, suppresses all of the samples of the pulse 45 except the maximum sample 85.

Figure 13:
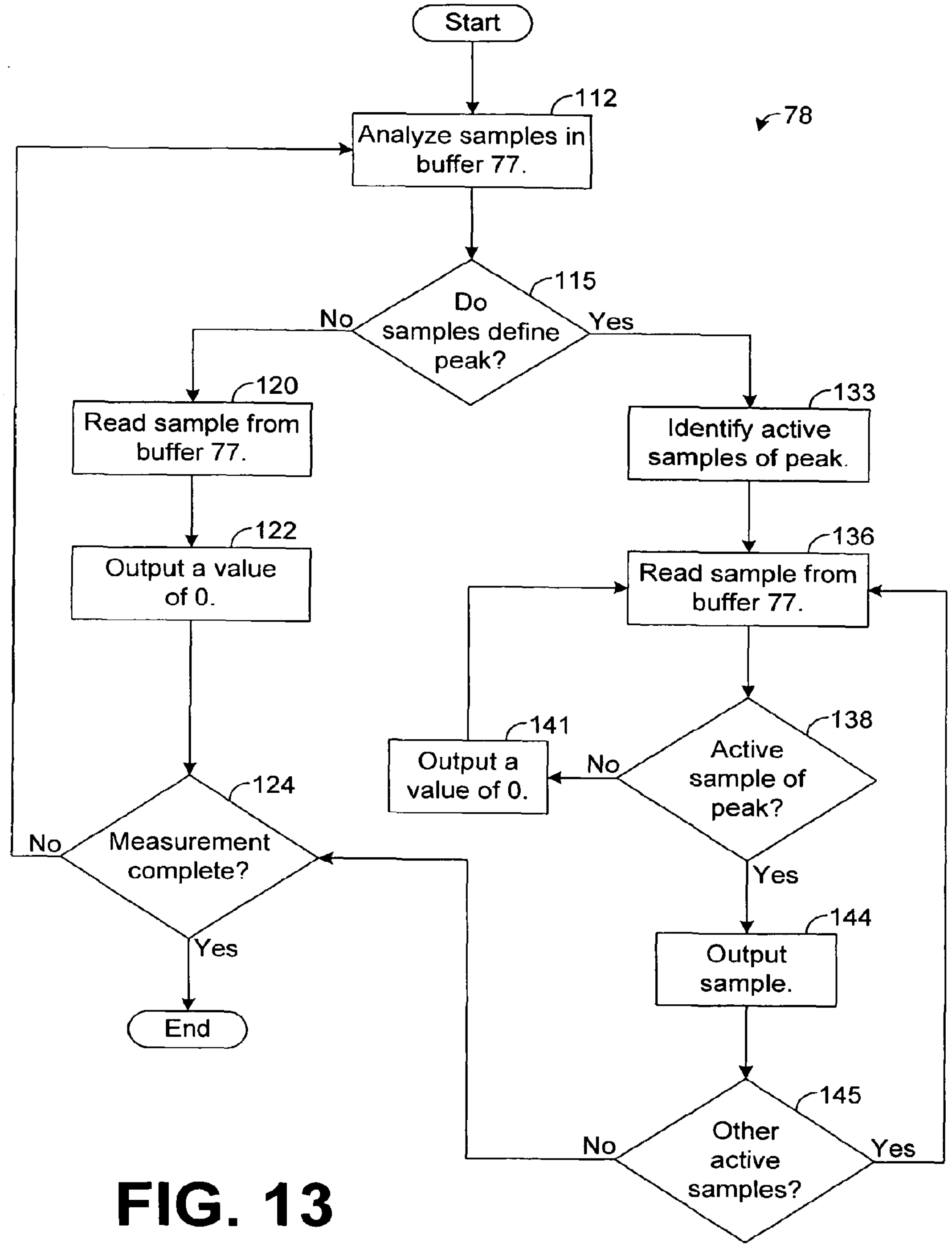
FIG. 13 is a flowchart illustrating an exemplary architecture and functionality of a sample adjuster depicted in FIG. 12.

Various techniques may be used to identify the peak of the pulse 45 and to suppress all of the samples of the pulse 45 except the maximum sample 85. FIG. 13 illustrates an exemplary process that may be used to achieve the foregoing. In this regard, samples are written to and read out of the buffer 77 (FIG. 12) on a first-in, first-out (FIFO) basis. During the first mass scan, samples of the pulse 45 are written to the buffer 77 by the A/D converter 27 as the converter 27 is sampling the analog pulse 41. As shown by block 112, the sample adjuster 78 analyzes the samples stored in the buffer 77 to determine whether these samples define a peak. In the instant embodiment, the sample adjuster 78 compares the samples in the buffer 77 and determines that these samples define a peak if such samples include at least s number of consecutive samples of increasing values followed by at least t number of consecutive samples of decreasing values.

Other techniques for identifying a peak of the pulse 45 are also possible in other embodiments. As an example, the sample adjuster 78 may identify any sample as being a peak if it is immediately preceded by a sample of lower value and immediately followed by a sample of lower value within the next two samples.

If the samples in buffer 77 do not define a peak, then the sample adjuster 78 reads and suppresses the next sample to be read out of the buffer 77. In particular, the sample adjuster 78 reads the next sample from the buffer 77 and outputs a value of zero, as shown by blocks 120 and 122, effectively replacing the sample's actual value with the value of zero (0). The value output by the sample adjuster 78 is then summed by summer 33 with a running sum from memory 29 at the address specified by the address register 21. Note that, as a sample is being read out of the buffer 77 by the sample adjuster 78, a new sample is being written to the buffer 77 by the A/D converter 27. If the current measurement being performed by the spectrometer 50 is not yet complete, then the sample adjuster 78 makes a "no" determination in block 124 and analyzes, in block 112, the samples, including the new sample written to the buffer 77, currently stored in the buffer 77.

Once the sample adjuster 78 determines that the buffer 77 is storing a peak of a pulse 45, then the sample adjuster 78 identifies the active samples of the peak, as shown by block 133. In the instant example, assume that the sample adjuster 78, for each peak, only identifies the peak's maximum sample as an active sample. Thus, the an active sample is determined to be the highest value stored in the buffer 77 when the sample adjuster 78 makes a "yes" determination in block 115 assuming that the buffer 77 is small enough such that it is unlikely that multiple peaks representing different ion packets can be simultaneously stored in the buffer 77. Thus, the sample adjuster 78 can compare each of the samples in the buffer 77 to find the sample with the highest value and identify this sample as the peak's "active sample," which represents the peak's maximum sample. Other techniques for identifying the active sample or samples of a peak may be employed in other embodiments.

In block 136, the sample adjuster 78 reads the next sample from the buffer 77 on a FIFO basis and, in block 138, determines whether this sample is an active sample. If not, the sample adjuster 78 suppresses this sample. In particular, upon reading the next sample in block 136, the sample adjuster 78 outputs a value of zero, as shown by block 141, effectively replacing the sample's actual value with the value of zero (0).

However, if the value read from the buffer 77 in block 136 is an active sample, then the sample adjuster 78 outputs the sample without changing its value, as shown by block 144. The value currently output by the sample adjuster 78 in either block 141 or block 144 is then summed by summer 33 with a running sum from memory 29 at the address specified by the address register 21. Further, in block 145 the sample adjuster 145 determines whether there are any additional active samples for the peak identified in block 133. In the instant example, there is only one active sample per peak. Thus, a "yes" determination should be made in block 145, and the sample adjuster 78 goes to block 124. However, in other examples for which there are more than one active sample per peak, it is possible for a "no" determination to be made in block 145. In such a case, the sample adjuster 78 returns to block 136.

Figure 14:
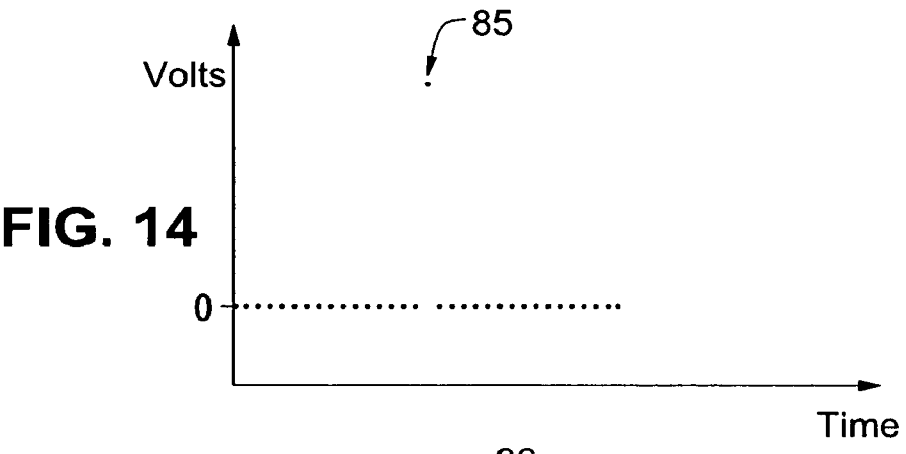
FIG. 14 is a graph illustrating a representation of an output of the sample adjuster of FIG. 12 upon processing, as input, samples in accordance with FIG. 6.

Moreover, in the instant example, rather than outputting the digital pulse 45 to the summer 33 as is done in the conventional spectrometer 10, the sample adjuster 78 outputs the samples shown by FIG. 14. As shown by FIG. 14, all of the samples of the pulse 45, except for the maximum sample 86, are suppressed by the sample adjuster 78. Thus, only the maximum sample 86 of the identified peak actually changes any of the running sums stored in the memory 29 and, therefore, affects the resultant spectrum defined by the data in memory 29.

Figure 15:
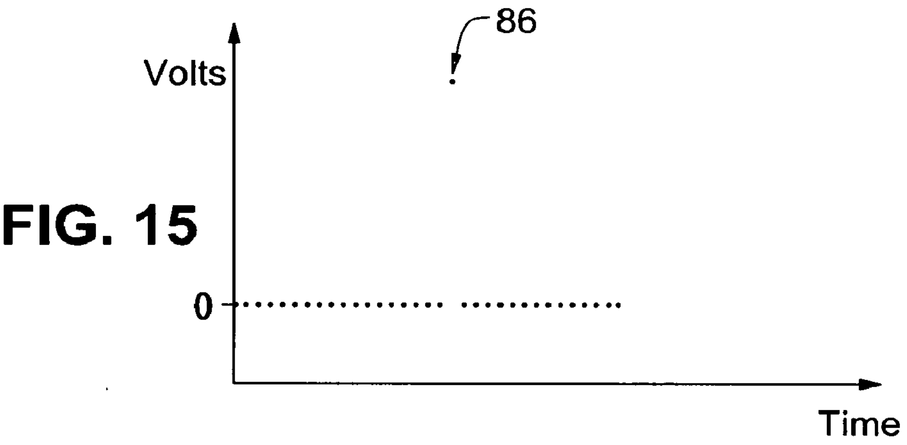
FIG. 15 is a graph illustrating a representation of an output of the sample adjuster of FIG. 12 upon processing, as input, samples in accordance with FIG. 7.
Figure 16:
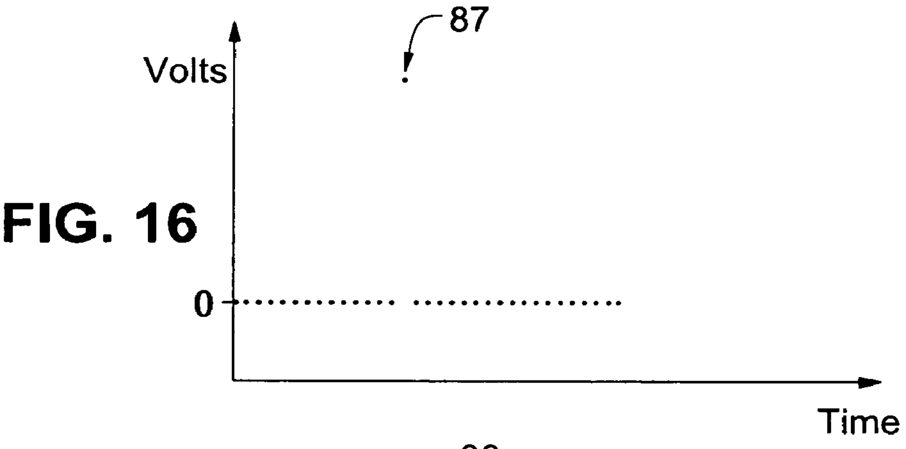
FIG. 16 is a graph illustrating a representation of an output of the sample adjuster of FIG. 12 upon processing, as input, samples in accordance with FIG. 8.
Figure 17:
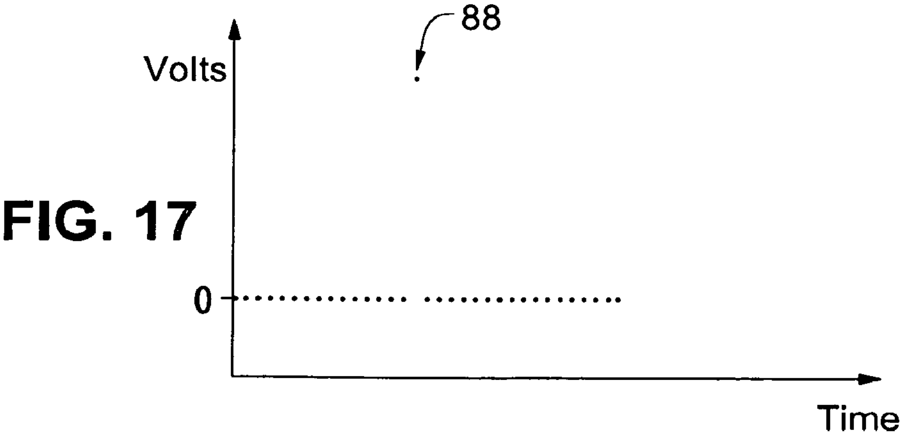
FIG. 17 is a graph illustrating a representation of an output of the sample adjuster of FIG. 12 upon processing, as input, samples in accordance with FIG. 9.

Moreover, the aforedescribed process is repeated for the digital pulses 46-48 output by the A/D converter 27 for subsequent mass scans. In particular, in the next consecutive mass scan, the A/D converter 27 outputs the digital pulse 46 shown by FIG. 7. The sample adjuster 78, however, suppresses all of the samples defining pulse 46 except for the maximum sample 86. Thus, the sample adjuster 78 converts the digital pulse 46 of FIG. 7 into that shown by FIG. 15. In the next consecutive mass scan, the A/D converter 27 outputs the digital pulse 47 shown by FIG. 8 and suppresses all of the samples defining pulse 47 except for the maximum sample 87. Thus, the sample adjuster 78 converts the digital pulse 47 of FIG. 8 into that shown by FIG. 16. Further, in the following mass scan, the A/D converter 27 outputs the digital pulse 48 shown by FIG. 9 and suppresses all of the samples defining pulse 48 except for the maximum sample 88. Thus, the sample adjuster 78 converts the digital pulse 48 of FIG. 9 into that shown by FIG. 17.

Figure 18:
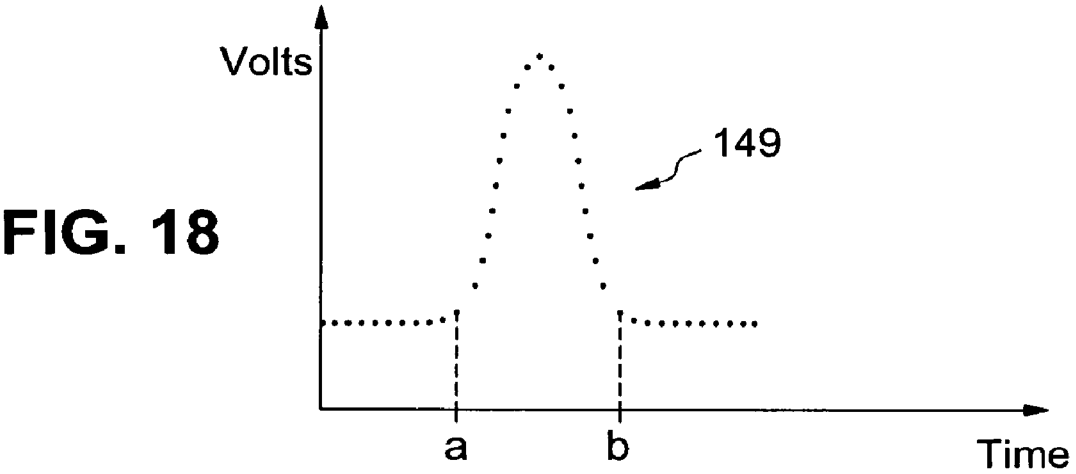
FIG. 18 is a graph illustrating a representation of an exemplary pulse defined by the mass spectrometer of FIG. 11 in summing the digital samples of FIGS. 14-17.

FIG. 18 depicts an exemplary resultant pulse 149 defined by summing the samples shown by FIGS. 14-17. As a result of the processing performed by the sample adjuster 78, as described above, the resultant pulse 149 has a width (b–a) that is more narrow than that of the resultant pulse 49 defined by the conventional spectrometer 10. Accordingly, the processing performed by the sample adjuster 78 enhances the resolution of the resultant mass spectrum defined by the data stored in the memory 29.

Note that it is possible for multiple samples of the same peak to have the same value. For example, a sample on the leading edge of a peak may have the same value as a sample on the trailing edge of the same peak. If more than one sample of the same peak are equal and have the highest sampled value for the peak, then the sample adjuster 78 may be configured to select any of the equal samples as the peak's active sample in block 133 of FIG. 13.

For example, when the two highest samples for a given peak are equal, the sample adjuster 78 may always select the earliest of the two equal samples or, in another embodiment, may always select the latest of the two equal samples. In another embodiment, the sample adjuster 78 may select the earliest and latest samples per peak in an alternating fashion. For example, for the first peak for which the highest two samples are equal, the sample adjuster 78 may select the earliest of the two equal samples as the first peak's maximum sample. For the second peak for which the highest two samples are equal, the sample adjuster 78 may select the latest of the two equal samples as the second peak's maximum sample. For the next peak for which the two highest samples are equal, the sample adjuster 78 may select the earliest of the two equal sample as the peak's maximum sample, and so on for the remaining peaks.

In addition, as described above, it is unnecessary for the sample adjuster 78 to allow only one sample to pass unsuppressed. For example, the sample adjuster 78 may allow the three highest samples per peak to pass unsuppressed. Other numbers of samples may be allowed to pass unsuppressed through the sample adjuster 78 per peak in other examples.

Generally, increasing the number of samples per peak allowed to pass unsuppressed decreases the resolution of the peaks of the resultant mass spectrum defined by the data stored in memory 29 but increases the accuracy of the peak centers for this resultant mass spectrum. Thus, a trade-off between peak resolution and center-of-peak accuracy exists when selecting the number of samples per peak that the sample adjuster 78 is to pass unsuppressed.

Indeed, to enhance peak resolution for the resultant mass spectrum thereby reducing center-of-peak accuracy, fewer samples per peak should be allowed to pass through the sample adjuster 78 unsuppressed. For example, to maximize peak resolution, one sample per peak may be allowed to pass through the sample adjuster 78 unsuppressed, as described above. However, to enhance center-of-peak accuracy for the resultant mass spectrum thereby reducing peak resolution, more samples per peak may be allowed to pass through the sample adjuster 78 unsuppressed. For example, to maximize center-of-peak accuracy thereby reducing peak resolution, all of the samples per peak may be allowed to pass through the sample adjuster 78 unsuppressed. Moreover, the number of samples per peak allowed to pass through the sample adjuster 78 unsuppressed may be selected to optimize peak resolution and center-of-peak accuracy considerations.

The number of samples per peak identified as active samples and, therefore, allowed to pass through the sample adjuster 78 unsuppressed may be predefined in at least some embodiments. For example, a user may specify such number prior to a measurement of a mass sample. Alternatively, the sample adjuster 78 may store a default number that is used unless the user specifies another number to be used for a measurement. In another embodiment, the sample adjuster 78 may be hardcoded to allow a certain number of samples to pass unsuppressed for each peak. Other techniques for controlling which samples are suppressed and unsuppressed are possible in other embodiments.

Regardless of the number of samples to be selected as "active samples" that are to pass through the sample adjuster 78 unsuppressed for a given peak, it is generally desirable for the highest sample values to be so selected. For example, if only one sample is to be selected as an active sample for a peak and, therefore, to remain unsuppressed, then it is desirable for the selected sample for the peak to be the one with the highest value (i.e., the peak's maximum sample). If three samples are to be selected as active samples for a peak, then it is desirable for the selected samples for the peak to be the ones with the three highest values. Ensuring that the highest values are selected as the active samples generally increases the accuracy of the resultant spectrum stored in memory 29.

We claim:

1. A mass spectrometer, comprising:

an ion detector;

an analog-to-digital (A/D) converter configured to generate digital samples representing an analog signal received from the ion detector during a mass scan;

a sample adjuster configured to identify a peak defined by the samples and to suppress all but at least one of the samples defining the identified peak; and an adder configured to sum the at least one of the samples not suppressed by the sample adjuster with corresponding samples representing analog signals received from the ion detector during previous mass scans and not suppressed by the sample adjuster, wherein the summed samples define a mass spectrum.

2. The mass spectrometer of claim 1, wherein the sample adjuster is configured to suppress all but the at least one of the samples defining the identified peak based on a comparison of the at least one of the samples to another of the samples defining the identified peak.

3. The mass spectrometer of claim 1, wherein the sample adjuster is configured to determine whether the at least one of the samples is a maximum sample of the samples defining the identified peak and to suppress all but the at least one of the samples based on the determination.

4. The mass spectrometer of claim 1, wherein the sample adjuster is configured to identify a maximum sample of the samples defining the identified peak and to transmit the maximum sample to the adder without suppressing the maximum sample.

5. The mass spectrometer of claim 1, wherein the sample adjuster is configured to suppress all but the at least one of the samples defining the identified peak by assigning a value of zero to all but the at least one of the samples.

6. The mass spectrometer of claim 1, wherein the sample adjuster is configured to allow the at least one of the samples to pass unsuppressed through the sample adjuster and to suppress each of the other samples defining the identified peak such that a resolution of a peak of the mass spectrum is enhanced.

7. The mass spectrometer of claim 1, wherein the sample adjuster is configured to suppress all but at least one of the samples defining the identified peak by setting the samples subject to suppression to a value that prevents the samples from affecting the mass spectrum.

8. The mass spectrometer of claim 7, wherein the sample adjuster is configured to set the samples subject to suppression to a value of zero.

9. A mass spectrometer, comprising:

an ion detector;

an analog-to-digital (A/D) converter configured to generate digital samples representing an analog signal received from the ion detector during a mass scan;

an adder configured to sum the samples with corresponding unsuppressed samples representing analog signals received from the ion detector during previous mass scans, wherein the summed samples define a mass spectrum; and a sample adjuster configured to identify a peak defined by the samples and to suppress all but at least one of the samples defining the identified peak to enhance resolution of a peak in the mass spectrum.

10. The mass spectrometer of claim 9, wherein the sample adjuster is configured to suppress all but the at least one of the samples defining the identified peak based on a comparison of the at least one of the samples to another of the samples defining the identified peak.

11. The mass spectrometer of claim 9, wherein the sample adjuster is configured to determine whether the at least one of the samples is a maximum sample of the samples defining the identified peak and to suppress the all but the at least one of the samples based on the determination.

12. The mass spectrometer of claim 9, wherein the sample adjuster is configured to identify a maximum sample of the samples defining the identified peak and to transmit the maximum sample to the adder without suppressing the maximum sample.

13. The mass spectrometer of claim 9, wherein the sample adjuster is configured to select a predefined number of the samples defining the identified peak and to suppress each of the non-selected samples defining the identified peak.

14. The mass spectrometer of claim 9, wherein the sample adjuster is configured to suppress all but at least one of the samples defining the identified peak by setting the samples subject to suppression to a value that prevents the samples from affecting the mass spectrum.

15. The mass spectrometer of claim 14, wherein the sample adjuster is configured to set the samples subject to suppression to a value of zero.

16. A method implemented on a mass spectrometer for generating a mass spectrum, the method comprising:

generating, by the mass spectrometer, an analog signal representing ions detected during a mass scan;

generating, by the mass spectrometer, digital samples representing the analog signal;

identifying, by the mass spectrometer, a peak defined by the samples;

summing, by the mass spectrometer, the samples with corresponding unsuppressed samples representing analog signals generated during previous mass scans to define a mass spectrum; and suppressing, by the mass spectrometer, all but at least one of the samples defining the peak identified by the identifying to increase resolution of the mass spectrum.

17. The method of claim 16, wherein:

the method further comprises comparing, by the mass spectrometer, the at least one of the samples defining the identified peak to another of the samples defining the peak identified by the identifying; and the suppressing is based on the comparing.

18. The method of claim 16, wherein:

the method further comprises identifying, by the mass spectrometer, a maximum sample of the samples defining the peak identified by the identifying; and the suppressing is based on the identifying a maximum sample.

19. The method of claim 16, wherein:

the method further comprises comparing, by the mass spectrometer, the samples defining the peak identified by the identifying and selecting, by the mass spectrometer, a predefined number of samples defining the peak identified by the identifying based on the comparing; and the suppressing comprises suppressing, based on the selecting, each of the non-selected samples of the peak identified by the identifying.

20. The method of claim 16, wherein the suppressing comprises setting the samples subject to suppression to a value that prevents the samples subject to suppression from affecting the mass spectrum.

* * * * *